(12) United States Patent
Franke (10) Patent No.: US 8,401,986 B1
(45) Date of Patent: Mar. 19, 2013

(54) SYSTEM AND METHOD FOR EFFICIENTLY GENERATING ASSOCIATION RULES

(75) Inventor: David Franke, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 883 days.

(21) Appl. No.: 10/912,699

(22) Filed: Aug. 5, 2004

(51) Int. Cl.
G06F 17/00 (2006.01)
G06N 5/02 (2006.01)

(52) U.S. Cl. .................................................. 706/47

(58) Field of Classification Search ................ 705/1, 14; 706/45, 46, 47, 48, 12
See application file for complete search history.

(56) References Cited

U.S. PATENT DOCUMENTS

| | | | | |
|---|---|---|---|---|
| 5,974,405 | A | 10/1999 | McGuinness et al. | 706/45 |
| 6,651,048 | B1 | 11/2003 | Agrawal et al. | 707/2 |
| 6,754,651 | B2 | 6/2004 | Nanavati et al. | 707/3 |
| 7,433,879 | B1 | 10/2008 | Sharma et al. | |
| 2002/0152201 | A1 | 10/2002 | Nanavati et al. | 707/3 |
| 2003/0014306 | A1* | 1/2003 | Marko | 705/14 |
| 2003/0217335 | A1 | 11/2003 | Chung et al. | 715/514 |

OTHER PUBLICATIONS

R. Bayardo et al., 'Constraint-Based Rule Mining in Large, Dense Databases,' Proc. of the 15th Int'l Conf. on Data Engineering, 1999.*
'Hardware/Softwear CoDesign: A Perspective': Franke, 1991, IEEE, CH2982-7/91, pp. 344-352.*
R. Bayardo et al., "Constraint-Based Rule Mining in Large, Dense Databases," Proc. of the 15th Int'l Conf. on Data Engineering, 1999.
R. Agrawal et al., "Mining Association Rules Between Sets of Items in Large Databases," Proceedings of the ACM SIGMOD Int'l Conf. on Management of Data, pp. 207-216 (1993).
J. Han et al., "Mining Frequent Patterns Without Candidate Generation," Proceedings of the ACM SIGMOD Int'l Conf. on Management of Data, pp. 1-12 (2000).

* cited by examiner

Primary Examiner — Kakali Chaki
Assistant Examiner — Peter Coughlan
(74) Attorney, Agent, or Firm — Hamilton & Terrile, LLP; Michael Rocco Cannatti (57) ABSTRACT

A data processing system processes data sets (such as low-resolution transaction data) into high-resolution data sets by mapping generic information into attribute-based specific information that may be processed to identify frequent sets therein. When association rules are generated from such frequent sets, the complexity and/or quantity of such rules may be managed by removing redundancies from the rules, such as by removing rules providing only trivial associations, removing rules having only a part group as the consequent, modifying rules to remove redundant antecedent items and/or filtering subsumed rules from the generated rule set that do not provide sufficient lift to meet an adjustable specialization lift threshold requirement.

24 Claims, 4 Drawing Sheets

SYSTEM AND METHOD FOR EFFICIENTLY GENERATING ASSOCIATION RULES

BACKGROUND OF THE INVENTION

1. Field of the Invention

The present invention relates in general to the field of database analysis. In one aspect, the present invention relates to a system and method for data mining operations for identifying association rules contained in database records.

2. Description of the Related Art

The ability of modern computers to assemble, record and analyze enormous amounts of data has created a field of database analysis referred to as data mining. Data mining is used to discover association relationships in a database by identifying frequently occurring patterns in the database. These association relationships or rules may be applied to extract useful information from large databases in a variety of fields, including selective marketing, market analysis and management applications (such as target marketing, customer relation management, market basket analysis, cross selling, market segmentation), risk analysis and management applications (such as forecasting, customer retention, improved underwriting, quality control, competitive analysis), fraud detection and management applications and other applications (such as text mining (news group, email, documents), stream data mining, web mining, DNA data analysis, etc.). Association rules have been applied to model and emulate consumer purchasing activities by describing how often items are purchased together. Typically, a rule consists of two conditions (e.g., antecedent and consequent) and is denoted as $A \Longrightarrow C$ where A is the antecedent and C is the consequent. For example, an association rule, "laptop$\Longrightarrow$ speaker (80%)," states that four out of five customers that bought a laptop computer also bought speakers.

The first step in generating association rules is to review a database of transactions to identify meaningful patterns (referred to as frequent patterns, frequent sets or frequent itemsets) in a transaction database, such as significant purchase patterns that appear as common patterns recurring among a plurality of customers. Typically, this is done by using constraint thresholds such as support and confidence parameters, or other guides to the data mining process. These guides are used to discover frequent patterns, i.e., all sets of itemsets that have transaction support above a pre-determined minimum support S and confidence C threshold. Various techniques have been proposed to assist with identifying frequent patterns in transaction databases, including using "Apriori" algorithms to generate and test candidate sets, such as described by R. Agrawal et al., "Mining Association Rules Between Sets of Items in Large Databases," Proceedings of ACM SIGMOD Int'l Conf. on Management of Data, pp. 207-216 (1993). However, candidate set generation is costly in terms of computational resources consumed, especially when there are prolific patterns or long patterns in the database and when multiple passes through potentially large candidate sets are required. Other techniques (such as described by J. Han et al., "Mining Frequent Patterns Without Candidate Generation," Proceedings of ACM SIGMOD Int'l Conf. on Management of Data, pp. 1-12 (2000)) attempt to overcome these limitations by using a frequent pattern tree (FPTree) data structure to mine frequent patterns without candidate set generation (a process referred to as FPGrowth). With the FPGrowth approach, frequency pattern information is stored in a compact memory structure.

Once the frequent sets are identified, the association rules are generated by constructing the power set (set of all subsets) of the identified frequent sets, and then generating rules from each of the elements of the power set. For each rule, its meaningfulness (i.e., support, confidence, lift, etc.) is calculated and examined to see if it meets the required thresholds. For example, if a frequent pattern {A, B, C} is extracted—meaning that this set occurs more frequently than the minimum support S threshold in the set of transactions—then several rules can be generated from this set:

$\{A\} \Longrightarrow \{B, C\}$
$\{B\} \Longrightarrow \{A, C\}$
$\{C\} \Longrightarrow \{A, B\}$
$\{A, B\} \Longrightarrow \{C\}$
etc.

where a rule $A \Longrightarrow B$ which indicates that "Product A is often purchased together with Product B," meaning that there is an association between the sales of Products A and B. Such rules can be useful for decisions concerning product pricing, product placement, promotions, store layout and many other decisions.

Conventional data mining approaches use generic item descriptions, such as the SKU (stockable unit number) when identifying items or products in a transaction database. When these generic descriptions are used to identify frequent sets, the frequent sets are not large and power-set/rule generation is tractable. However, conventional data mining techniques using item data at the SKU (stockable unit number) level do not provide sufficient information to develop meaningful association rules for complex products. For example, if there are three transactions involving the purchase of a computer identified as "Desktop-SKU" with one of the transactions also involving the purchase of DVD disks, the product level of description used to identify the computer does not reveal that two of the computers did not include DVD drives, while the third computer (which was purchased with the DVD disks) did include a DVD drive. As this example demonstrates, this lack of granularity in the item description diminishes the quality of association rules that can be generated, resulting in limited pattern correlation.

During the generation of association rules from frequent sets (for example, with algorithms such as FPGrowth), the number of generated rules (and processing time required to generate the rules) can become intractable as the number of frequent sets increases, often resulting in redundant rules being generated. An example of rule redundancy is rule subsumption, when a first rule R1 subsumes a second rule R2 whenever the consequents of R1 are a superset of the consequents of R2 (anything concluded by R2 is also concluded by R1), and the antecedents of R1 are satisfied in any context in which the antecedents of R2 are satisfied (antecedents of R1 are more general that the antecedents of R2). For example, with rules R1 and R2 (where R1: $A \Longrightarrow C,D$, and R2: $A,B \Longrightarrow C,D$), R1 subsumes R2. Other examples of rule redundancy include rules that provide trivial associations and rules with redundant antecedents. Conventional approaches for removing redundancy have not been effective. For example, when R1 subsumes R2, conventional association rule generation approaches (such as FPGrowth) would discard R2 if and only if the confidence of R1 is greater than or equal to the confidence of R2. For the most part, this confidence condition is rarely if ever met, as more general rules tend to have lower confidence. An article by Bayardo et al., entitled "Constraint-Based Rule Mining in Large, Dense Databases," Proc. of the 15th Int'l Conf. on Data Engineering (1999), discusses a simple technique for applying rule subsumption when the subsumed rule has higher confidence, but this higher confidence does not meet an absolute minimum improvement threshold and is inflexibly applied.

As seen from the conventional approaches, a need exists for methods and/or apparatuses for improving the extraction of frequent patterns for use in data mining. There is also a need for finer granularity in the generation of frequent sets to better discover meaningful patterns without imposing the cost of a combinatorial explosion of the data that must be examined. In addition, there is a need for methods and/or apparatuses for efficiently generating association rules without requiring unwieldy candidate set generation, without requiring multiple database passes and without requiring additional time to generate association rules as the frequent set grows. Moreover, there is a need for an improved method and system for removing redundant association rules that allow beneficial general rules to be retained without unduly increasing the size of the generated rule set. Further limitations and disadvantages of conventional systems will become apparent to one of skill in the art after reviewing the remainder of the present application with reference to the drawings and detailed description which follow.

SUMMARY OF THE INVENTION

In accordance with one or more embodiments of the present invention, a system and method are provided for generating more meaningful frequent set data by providing finer granularity in the item descriptions used to generate frequent sets. In a selected embodiment, improved pattern correlation is provided by representing items in terms of their features so that a part or product may be represented in terms of its part group and/or various attribute-value pairs. This approach provides sufficient detail so that association rule mining can be used for complex products. However, where attribute-based association rule mining produces a large number of rules, this number can be reduced in a systematic manner and still retain the characteristics of the original rule set, thereby improving performance of the rule set at runtime by reducing the number of rules that are evaluated. For example, any additional complexity resulting from the increase in the number of generated association rules may be addressed by modifying association rules to remove redundant antecedent part group items. Complexity may also be reduced by discarding redundant rules, such as rules providing only trivial associations. In addition, complexity may be reduced by removing rules that are subsumed by other rules, including specifically subsumed rules that have a higher confidence that the subsuming rule, provided that the confidence of the subsumed rule does not meet or exceed a specialization lift threshold, such as an adjustable lift threshold. Specialization lift acts as an increment above the confidence of the subsuming rule to determine when subsumed rules should be removed (if the confidence of the subsumed rule is below the threshold) or retained (if the confidence of the subsumed rule is at or above the threshold). In other words, a general rule should subsume a more specific rule if the more specific rule does not provide sufficient "lift," where lift is a measure of increase in confidence. For example, suppose R1 subsumes R2, and R1 has 30% confidence and R2 has 35% confidence. If the specialization lift threshold calculated for this rule is greater than five, this would result in R2 being removed from the generated rule set. The loss of the marginally increased confidence of R2 is deemed negligible compared to the expense of managing the additional rule. When considering a specific value for a specialization lift, a value that decreases with increasing confidence of the subsuming rule provides a means for further managing the specialization lift heuristic. When the confidence of both the subsuming rule and subsumed rule are low, a larger value for specialization lift allows more low confidence rules to be filtered. As the confidence of the subsuming rule increases, fewer rules should be filtered. Thus, the improved rule generation process filters the generated rule set to identify subsumed rules using an adjustable threshold so that general rules are retained and more specific rules that provide little in terms of improved confidence are discarded.

The objects, advantages and other novel features of the present invention will be apparent from the following detailed description when read in conjunction with the appended claims and attached drawings.

DETAILED DESCRIPTION

An efficient database mining method and apparatus is described for generating attribute-based frequent patterns from transaction databases, efficiently deriving association rules from the detailed frequent patterns, and removing redundancies from the derived rules. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
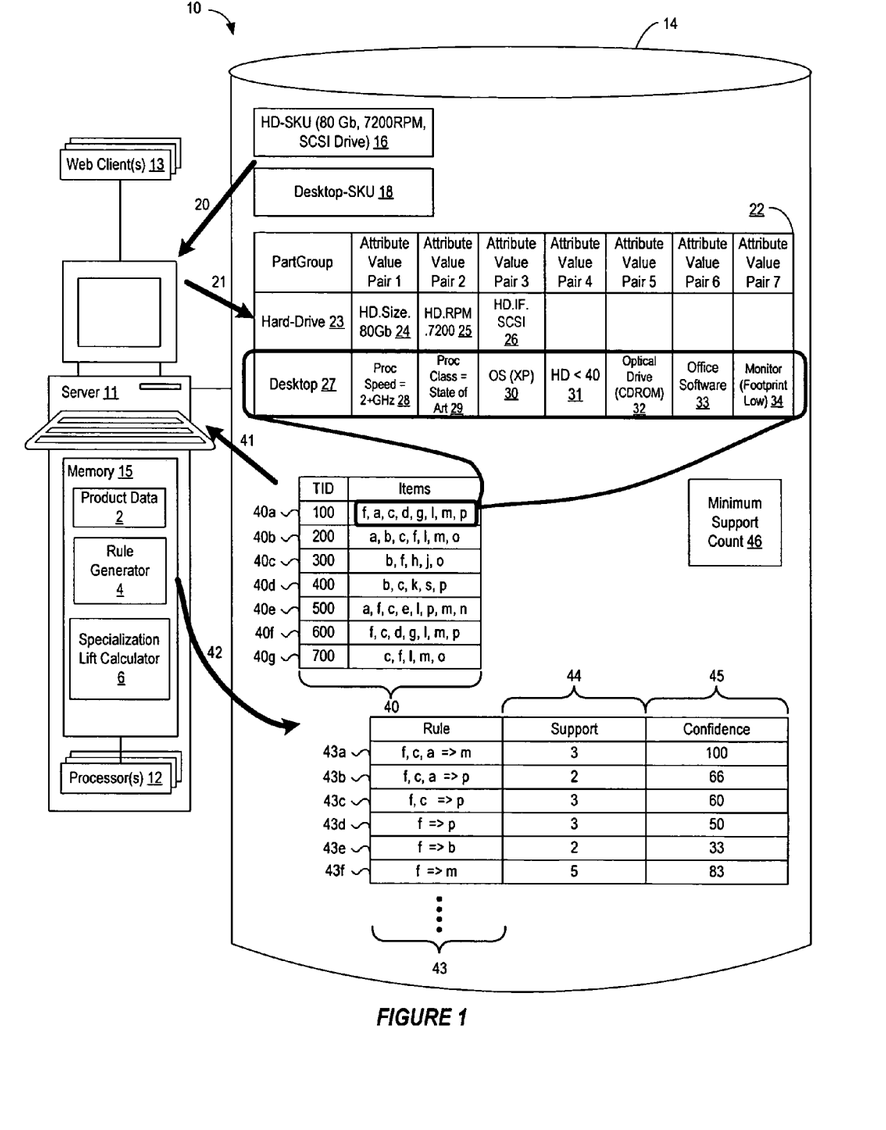
FIG. 1 illustrates an exemplary data processing system for generating high-resolution product information that may be used for mining detailed frequent pattern information.

Referring now to FIG. 1, a block diagram illustrates an exemplary data processing system 10 in which the present invention may be practiced by mapping or otherwise transforming a first data set of transaction information into a second data set of transaction information that provides more detailed information specifying the attributes of the purchased product. In a selected application, the second data set of transaction information may be used to generate cross-sell and up-sell recommendations based on frequent patterns mined from an order history store in a transaction database. By providing greater granularity to the transaction data, pattern correlation is improved by representing items in terms of their features so that a part or product may be represented in terms of its part group and various attribute-value pairs. For example, if there are three transactions involving the purchase of a computer with the third transaction also involving the purchase of DVD disks, by including an identification for each computer item of whether it includes a DVD drive (e.g., Computer.DVDrive.No for the first and second computers and Computer.DVDrive.Yes for the third computer), sufficient detail is provided to enable more accurate correlation between the computer and disk purchases when generating association rules.

In the example depicted in FIG. 1, the data processing system 10 (e.g., a private wide area network (WAN) or the Internet) includes a central server computer system 11 and one or more networked client or server computer systems 13 that are connected to the network. Communication between central server computer system 11 and the networked computer systems 13 typically occurs over a network, such as a public switched telephone network over asynchronous digital subscriber line (ADSL) telephone lines or high-bandwidth trunks, for example, communications channels providing T1 or OC3 service. Networked client computer systems (e.g., 13) typically access central server computer system 11 through a service provider, such as an internet service provider ("ISP") by executing application specific software, commonly referred to as a browser, on the networked client computer systems 13.

In a selected embodiment, a first data set of transaction information is stored in a database 14 that may be accessed directly or indirectly by the server 11. In this example, the first data set identifies the items included in a plurality of transactions by including a generic product descriptor 16, 18 for each transaction item, such as the SKU (stockable unit number) for a purchased product. Thus, a hard drive that was purchased is identified with the hard drive SKU (stockable unit number) 16 and a desktop computer is identified with the desktop SKU 18. In accordance with an embodiment of the present invention described herein, the first data set of transaction information may be mapped or otherwise transformed into a second data set of transaction information that provides more detailed information identifying with greater specificity the attributes of the purchased product. In a selected embodiment, the data transformation is implemented with a computer or other data processing functionality (e.g., server 11) which loads a copy of the first data set 16, 18 from a database 14 into local memory 15, as indicated with arrow 20. Using a product detail knowledge database (such as contained in product data memory 2) that specifies various product feature details for each transaction item, the server 11 maps or transforms the generic product descriptors of the first data set into a second data set that specifies additional details and/or features for the item of interest, such as more detailed product descriptor information. In the depicted embodiment, part numbers in an order (e.g., 16, 18) may be mapped to a Part Group identifier and to a set of attribute names and values (e.g., 23, 27, respectively) and stored in the database 14, as indicated with arrow 21.

With reference to the example depicted in FIG. 1, an 80 Gb, 7200 RPM, SCSI drive identified with the HD-SKU 16 could be mapped to the following attribute-based transaction items:
_Hard_Drive
_Hard_Drive._Size. 80 Gb
_Hard_Drive._RPM. 7200
_Hard_Drive._Interface.SCSI These items are included in a second data set 22 as an entry 23-26 which quantifies the consumer preferences for one or more products and associated product features and which is organized or stored in a structured format, such as a database or table. In this example, the original item description 16 is now expanded and represented by a Part Group identifier 23 and three attribute items 24, 25, 26. In similar fashion, the original item description 18 for a desktop computer is expanded and represented by a Part Group identifier 27 and seven attribute items 28-34 (in this example) that are stored as an entry in the second data set 22. These additional attribute items 28-34 specify the processor speed 28, processor class 29, operating system type 30, hard drive size 31, optical drive type 32, software package type 33, and monitor type 34 for the desktop item.

While the additional product detail information contained in the second data set has many potentially useful and interesting applications, it can be used in transaction database applications to provide more meaningful frequent pattern analysis. As will be appreciated by those of ordinary skill in the art, frequent patterns or itemsets may be constructed using data mining techniques to find interesting patterns from databases, such as association rules, correlations, sequences, episodes, classifiers, clusters and the like. The task of discovering and storing all frequent patterns from a database of items is quite challenging, given that the search space is exponential in the number of items occurring in the database. For example, FPTree and FPGrowth techniques may be used to generate association rules using a compact in-memory representation of the transaction database, such as described in U.S. patent application Ser. No. 10/870,360, entitled "Attribute-based Association Rule Mining," filed Jun. 17, 2004, and assigned to Trilogy Development Group, which is hereby incorporated by reference in its entirety. However, it is contemplated that other rule generation algorithms, including but not limited to an Apriori algorithm and its many variants, may also be used to generate rules in keeping with the present invention.

For example, association rules may be generated from the expanded second data set of transaction information that is included as part of a transaction database 40, as indicated with entries 40a-g in FIG. 1. An important consideration with data mining applications is the representation of the transaction database 40. Conceptually, such a database can be represented by a binary two-dimensional matrix in which every row (e.g., 40a) represents an individual transaction (with a transaction identifier (e.g., TID 100)) and the columns represent the items in the transaction (e.g., f, a, c, d, g, l, m, p). Such a matrix can be implemented in several ways. The most commonly used layout is the horizontal data layout. That is, each transaction has a transaction identifier and a list of items occurring in that transaction. Another commonly used layout is the vertical data layout, in which the database consists of a set of items, each followed by its cover.

In the example of FIG. 1, the server 11 begins the process of generating association rules 43 by retrieving the item descriptors from the transaction database 40 and a minimum support count 46, as indicated with arrow 41. As indicated with arrow 42, the server 11 identifies all items in the database 40 with a frequency meeting or exceeding the minimum support count requirement (e.g., the minimum support count is 3), and uses a rule generator 4 (depending on the rule generation algorithm used) to generate a plurality of association rules 43a-f. Each association rule has a support and confidence metric that is calculated by the server 11. For example, the support metric 44 is determined by the number of times the rule is supported in the transaction database 40, and the confidence metric 45 is determined by the percentage of times the antecedent of the rule leads to the consequent.

Simultaneously with or subsequent to the generation of the association rules 43, the server 11 may also be configured to filter the generated rules 43 to identify redundant rules that are candidates for removal or modification, such as by removing rules providing only trivial associations, removing rules that have only a part group as a consequent, modifying rules with redundant antecedent items to remove a redundant antecedent part group, or using a relaxed rule subsumption technique that may be flexibly calculated based on the confidence rating of the subsuming or subsumed rule. In particular, it may be advantageous to retain a more general association rule and to remove an association rule that is subsumed by the general association rule, even where the subsumed rule has a higher confidence than the general rule. For example, general rules may act as defaults that are applied if no more specific rule applies. However, if general rules are retained that have a confidence that is too low in relation to the subsumed rule, this can greatly increase the size of the generated rule set. Various embodiments of the present invention address this by flexibly calculating a specialization lift threshold for managing the size of the generated rule set when the confidence threshold is reduced.

By providing a scaled specialization lift threshold, a general rule is allowed to subsume a more specific rule (which may then be discarded) if the more specific rule does not provide sufficient "lift," where lift is a measure of increase in confidence of the subsumed rule over the subsuming rule. In accordance with selected embodiments of the present invention, the use of a scaled specialization lift threshold allows a larger lift threshold requirement to be applied to low confidence rules in order to avoid subsumption, and allows smaller lift threshold requirements to be applied to higher confidence rules to avoid subsumption. For example, a general rule with 30% confidence might subsume any more specific rules whose confidence is less than 50%, but not those more specific rules whose confidence is above 50%. But for higher confidence rules, the required lift may be adjusted to require a smaller lift threshold to avoid subsumption. For example, a general rule with 85% confidence would only subsume any more specific rule up to 88% confidence.

In accordance with the present invention, lift may be scaled in a variety of ways to provide an adjustable lift threshold that is determined as a function of the confidence of the subsuming rule and/or even as a function of the confidence of the subsumed rule. For example, the lift may be scaled in a linear fashion by first determining a complement of the confidence of the subsuming rule, such as be subtracting the confidence percentage of the subsuming rule from 100 percent. A lift parameter value between 0 and 1 may then be applied to the complement value to calculate a linear scaled specialization lift threshold. With such a scaled threshold, only subsumed rules exceeding the threshold would be retained, but subsumed rules that fall below the threshold would be discarded from the generated rules. In an alternative embodiment, the required lift may be scaled in a non-linear fashion, such as by subtracting the confidence of the subsuming rule from 100%, squaring the difference, and making this the lift required in confidence increase for a more specific rule to avoid subsumption. For example, a subsuming rule with confidence of 50% would require that a more specific rule must improve confidence 25% (0.5 squared) to avoid subsumption. Of course, other flexible scaling techniques may be implemented to adjust the lift threshold as a function of the confidence of the subsuming or subsumed rule.

Figure 2:
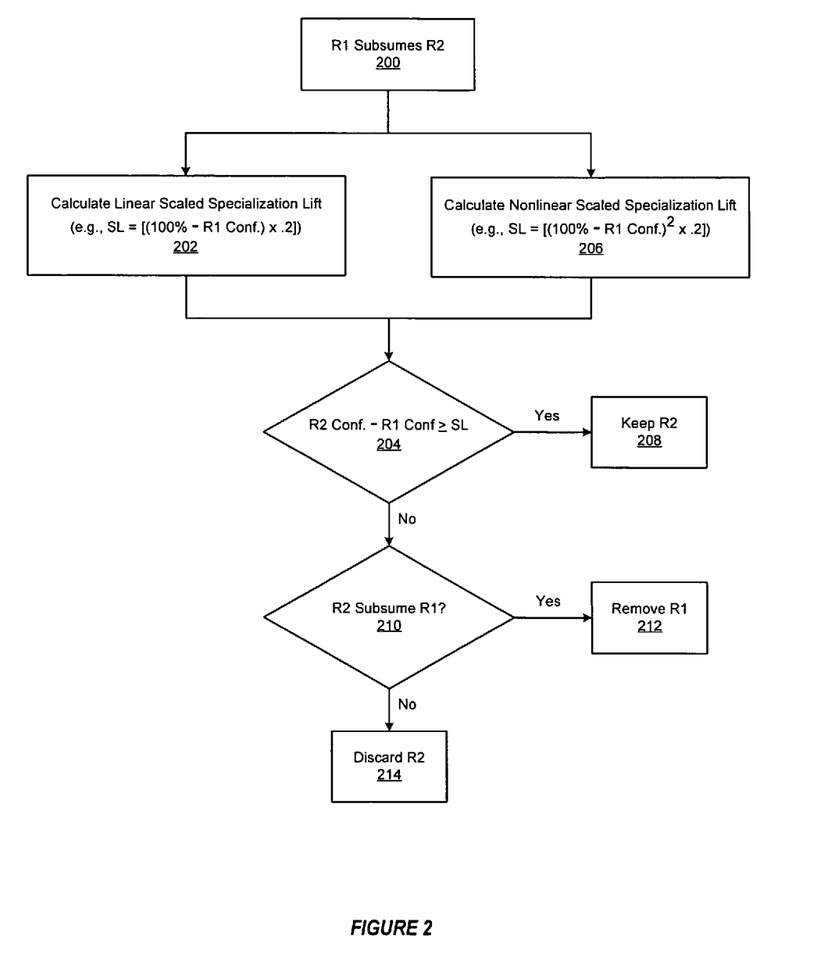
FIG. 2 illustrates selected exemplary flow methodologies for removing redundant rules from a set of generated association rules using an adjustable rule subsumption technique.

Turning now to FIG. 2, exemplary flow methodologies are illustrated for removing redundant rules from a set of generated association rules using an adjustable rule subsumption technique which allows a specialization lift threshold to be adjusted based on the confidence of the subsuming rule. Though selected examples of how to calculate the specialization lift threshold are illustrated in FIG. 2, it will be appreciated by those of ordinary skill in the art that any linear or non-linear calculation algorithm may be used to control the magnitude of the specialization lift threshold so that the threshold decreases as the confidence of the subsuming rule increases. These steps may be performed for each rule in the set of generated association rules to identify subsumed rules that may be removed from the generated set. In addition, it will be appreciated that the methodology of the present invention may be thought of as performing the identified sequence of steps in the order depicted in FIG. 2, though the steps may also be performed in parallel, in a different order, or as independent operations that separately calculate the specialization lift threshold and apply the threshold to the subject rule(s).

The description of the method can begin at step 200, where a first rule (e.g., rule R1) is determined to have subsumed a second rule (e.g., rule R2). While the mechanics of the subsumption determination can be accomplished by a variety of ways, there are essentially two requirements for a rule subsumption determination. First, the consequents of the first rule (e.g., subsuming rule R1) are determined to be a superset of the consequents of the second rule (e.g., subsumed rule R2). The second requirement is that the antecedents of the first rule (e.g., subsuming rule R1) are satisfied in any context in which the antecedents of the second rule (e.g., subsumed rule R2) are satisfied. For example, rule R1 subsumes rule R2 when anything concluded by R2 is also concluded by R1, and when the antecedents of R1 are more general that the antecedents of R2.

Once it is determined that a first rule subsumes a second rule, the process of calculating a specialization lift threshold begins. As described herein, any calculation algorithm that provides for an adjustable threshold may be used in connection with the present invention, including but not limited to linear scaling algorithms and non-linear scaling algorithms. When considering a specific value for a specialization lift, a value that decreases with increasing confidence of the subsuming rule provides a means for further managing the specialization lift heuristic. When the confidence of both the subsuming rule and subsumed rule are low, a larger value for specialization lift allows more low confidence rules to be filtered. As the confidence of the subsuming rule increases, fewer rules should be filtered.

In a selected embodiment, the specialization lift threshold (SL) is calculated at step 202 as a simple linear scaled function of the confidence of the subsuming rule R1 by applying a scaling factor between 0 and 1 (e.g., 0.2) to the difference between the confidence of the subsuming rule and 100% (e.g., SL=(100%−R1confidence)*0.2). Of course, other scaling factors can be used at step 202. In an alternative embodiment, a higher order relationship can force the threshold to be very small for high confidence rules, and still large for low confidence rules. For example, the adjustable specialization lift threshold (SL) may be calculated at step 206 as a non-linear scaled function of the confidence of the subsuming rule R1 by applying a scaling factor between 0 and 1 (e.g., 0.2) to the square of the difference between the confidence of the subsuming rule and 100% (e.g., SL=(100%−R1confidence)* (100%−R1confidence)*0.2)). Again, other scaling factors can be used to calculate the non-linear scaled specialization lift.

Once the adjustable specialization lift threshold (SL) is calculated, this threshold is used to determine if the confidence of the subsumed rule provides sufficient lift. If the subsumed rule provides sufficient lift, it is retained, otherwise it is discarded. As will be appreciated, the sufficiency of lift may be evaluated with reference to the adjustable specialization lift threshold being met or exceeded, or may alternatively be evaluated with reference to the adjustable specialization lift threshold being exceeded, as the case may be. In the illustrative embodiment, if the confidence of the subsumed rule (e.g., R2) exceeds the confidence of the subsuming rule (e.g., R1) by at least the threshold amount SL (affirmative outcome to decision 204), the subsumed rule (e.g., R2) is retained. However, if the confidence of the subsumed rule (e.g., R2) does not exceed the confidence of the subsuming rule (e.g., R1) by at least the threshold amount SL (negative outcome to decision 204), the subsumed rule (e.g., R2) may be discarded.

Once it has been determined that the subsumed rule does not provide sufficient lift to be retained (negative outcome to decision 204), it may be determined if the first and second rules are the same rule by determining at step 210 if the second rule (e.g., R2) subsumes the first rule (e.g., R1). Alternatively, the determination of whether the second rule subsumes the first rule may also be made earlier in the process (e.g., immediately after step 200). If second rule subsumes the first rule (affirmative outcome to decision 210), this means that the two rules are the same, in which case the first rule (e.g., R1) may be removed (at step 212). If the second rule does not subsume the first rule (negative outcome to decision 210), then the second rule (e.g., R2) may be discarded from the generated set (step 214).

There are other rule set simplification techniques which may be implemented in accordance with the present invention. In accordance with a selected embodiment, the association rules that are generated may be processed to identify and remove any rules providing only trivial associations between the antecedent and consequent. For example, an association rule that has an antecedent in the same part group as the consequent (e.g., [_Monitor,_Operating_System]→[_Monitor.Type.3]) provides only a trivial association, and may be removed from the mined rules.

Rule simplification may also be improved by modifying the existing mined rules to remove redundant antecedent information from the rules. For example, the association rules that are generated may be processed to identify rules having a part group item that is redundant to another item in the antecedent. An example of such a rule would be [_Optical_Drive. Type.100, _Operating_System, _Optical_Drive]→[_Monitor.Type.4]. When such a rule is identified, it may be modified to remove the antecedent part group (_Optical_Drive) from the antecedent.

Rule simplification may also be improved by removing any rule that includes only a part group item as the consequent. The elimination of such rules removes or reduced some inference direction ambiguities.

As will be appreciated by those of ordinary skill in the art, the removal or simplification of redundant rules from a generated set of association rules is only part of the process of generating association rules. In particular, association rule mining algorithms typically require two steps: identifying all frequent patterns (also referred to as frequent sets) that satisfy a minimum support requirement, and generating all association rules that satisfy a minimum confidence requirement using the identified frequent patterns. The second step—generating association rules—may be accomplished by generating the power set of the frequent set (the set of all possible subsets) and then calculating, for each rule derivable from the members of the power set, the support, confidence, lift or other indicia of meaningfulness to determine if the rule meets the required thresholds. Once the generated rules meeting the required thresholds are identified, redundant rules may be removed by, for example, removing rules providing only trivial associations, modifying rules to remove redundant antecedent items and/or filtering subsumed rules from the generated rule set that do not provide sufficient lift to meet the specialization lift threshold requirements.

Figure 3:
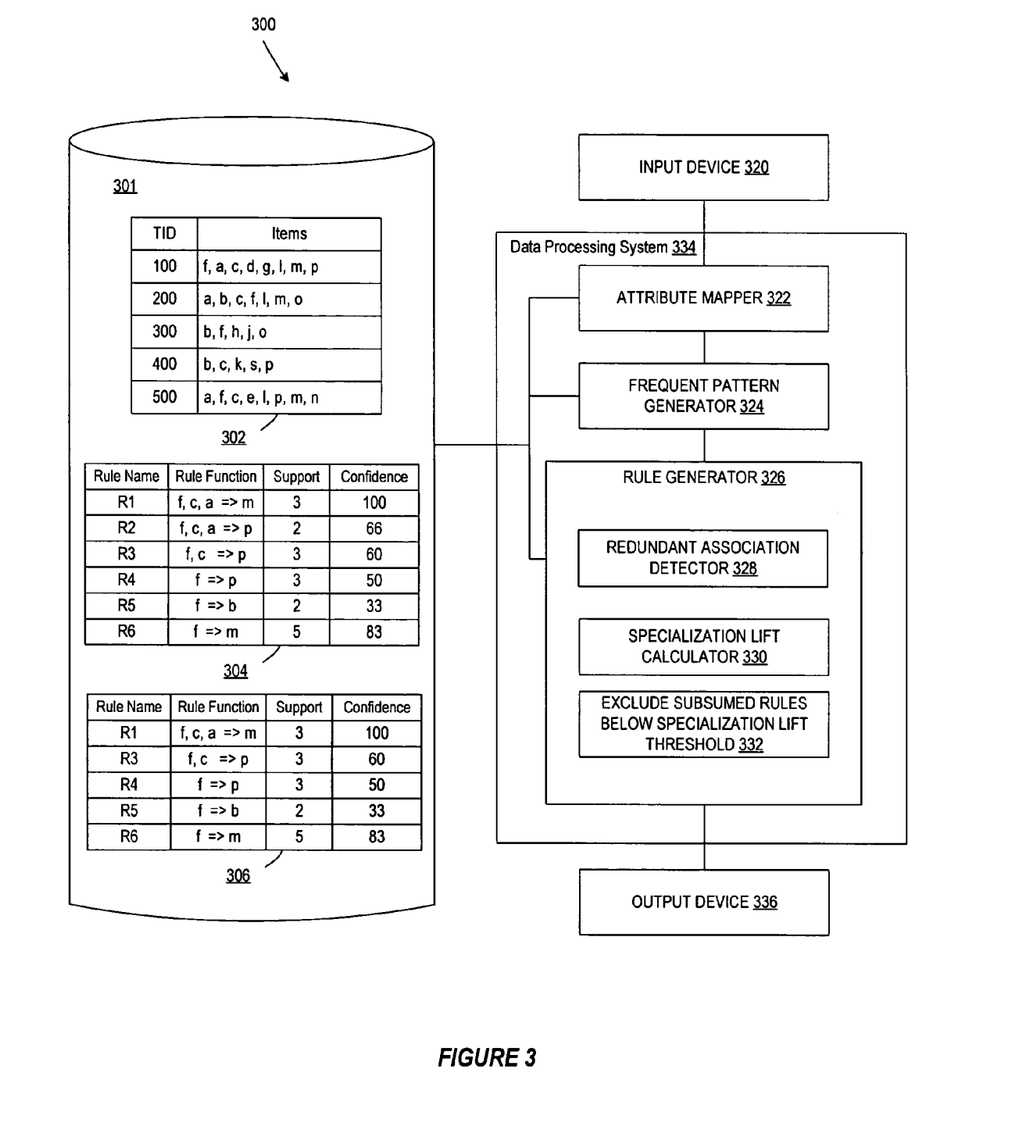
FIG. 3 depicts an exemplary system for mining attribute-based association rules from a transaction database.

FIG. 3 depicts an exemplary system for efficiently generating attribute-based association rules mined from frequent patterns identified in a transaction database. In FIG. 3, the system 300 comprises a data processing engine or unit 334 coupled to a storage database 301 that stores a transaction database 302. The system 300 also includes an input device 320 where at least one condition of the association rules to be mined is inputted by a user. For example, the input device 320 is used to input the conditions (i.e., support, confidence, lift, etc.) for the association rule to be mined. An attribute mapper 322 is also included for mapping a first data set to a second, highly granular data set as described herein. In addition, a frequent pattern generator 324 is included for identifying frequent patterns occurring in the transaction database 302. For example, the frequent pattern generator 324 may use FPGrowth techniques to identify frequent patterns in the transaction database 302 meeting the minimum support count inputted by the user. At a general level, a rule generator 326 is included for generating association rules from the frequent pattern information, and an output device 336 is also provided for outputting the mined association rules. The storage database 301 may be connected to the attribute mapper 322, frequent pattern generator 324 and/or rule generator 326. Alternatively, transaction data from the storage database 301 may be transformed by the attribute mapper 322, passed directly to the frequent pattern generator 324 for processing to identify frequent patterns, and then passed to the rule generator 326 for rule generation.

The attribute mapper 322 is provided for transforming generic item descriptors in the transaction database to provide more detailed item description information concerning various product attributes and/or qualities for the item. For example, part number information may be mapped into more granular product or attribute information identifying specific features of the product, where the specific product or attribute information may be presented as native or numeric values. In addition, the mapping function may transform the product information to include more general information for the product, such as a Part Group or other generalized identifier for the product. Each of the transformed descriptors may be treated as separate items for use with the data mining techniques described herein to provide improved pattern correlation based on the more specific attribute information contained in the transaction data.

At the frequent pattern generator 324, all of the frequent patterns from the transaction database 302 are compiled, and the support of each frequent pattern may be obtained. As will be appreciated, the use of attribute-based representations as items in a database results in a combinatorial explosion in the quantity of frequent pattern information that is output by the frequent pattern generator 324. For example, by expanding generic items into multiple attribute/value items, the transaction size of the frequent patterns may increase by four to five times. Using the example transaction database 302 depicted in FIG. 3, the conventional approach for identifying products might only have a single item for transaction TID 100, but by expanding the items to include attribute values, the transaction TID 100 includes eight items—f, a, c, d, g, l, m and p.

At the rule generator 326, a preliminary rule set 304 of association rules (e.g., R1-R6) is derived by using the frequent pattern information provided by the frequent pattern generator 324. A broad variety of efficient algorithms for mining association rules have been developed in recent years, including algorithms based on the level-wise Apriori framework, TreeProjection and FPGrowth algorithms. While there are techniques for reducing the processing resources required by the rule generation algorithms (such as described in the incorporated U.S. patent application Ser. No. 10/870,360, entitled "Attribute-based Association Rule Mining"), the use of attribute-based items for the transaction database 302 can still result in the generation of a large rule sets 304 that include redundant rules and/or associations. As the size of the generated set of association rules increases, the time required to apply the generated association rules to obtain purchase recommendations also increases. As a result, the available data mining techniques still in many cases have high processing times leading to increased I/O and CPU costs.

Various embodiments of the present invention may be applied to remove and/or modify redundant rules, thereby reducing the size or complexity of the preliminary rule set 304 to form a final rule set 306. In accordance with a selected embodiment, the rule generator 326 includes a redundant association detector 328 which may be used to identify generated rules containing redundant associations that may be modified and/or removed from the preliminary rule set 304. For example, if the redundancy detector 328 determines that an association rule (e.g., R2) provides only a trivial association between its antecedent (e.g., [f, c, a]) and its consequent (e.g., [p]), then the association rule would not be included in the final rule set 306. An example of such a trivial association would occur when the consequent item (e.g., [p]) belongs to a part group specified by an antecedent item (e.g., [f]).

In accordance with an alternative embodiment, the redundant association detector 328 may also identify a rule in the preliminary rule set 304 that includes an antecedent item that is redundant of other antecedent items in the rule. Such rules with redundant antecedents may be modified to remove the redundancy from the antecedent. For example, if the redundancy detector 328 determines that an association rule (e.g., R2) has an antecedent part group item (e.g., item [f]) that is redundant of another antecedent item (e.g., item [a]) in the rule, then the rule generator 326 would modify the association rule to remove the redundant part group item (e.g., item [f]). Though not depicted in FIG. 3, this approach would result in the final rule set 306 including a rule R2 defined as [c, a]→[p].

In accordance with yet another embodiment, where the preliminary rule set 304 includes a first rule that subsumes a second rule, the present invention enables the second rule to be removed from the preliminary rule set 304 if the confidence of the second rule does not provide sufficient lift over the confidence of the first rule. The requirement of "sufficient lift" may be determined with reference to an adjustable specialization lift threshold value that is calculated by a specialization lift calculator 330. Any subsumed rule not meeting the calculated specialization lift threshold requirement may be removed from the preliminary rule set 304 by the exclusion module 332 so that it is not included in the final rule set 306.

For example, suppose R3 subsumes R2, and R3 has 60% confidence and R2 has 66% confidence. Setting the specialization lift threshold greater than six would result in R2 being removed from the generated rule set. The increased confidence of R2 is deemed negligible compared to the expense of managing the additional rule. Note that, to remove R2, it should be the case that R2 does not subsume R3, meaning that R2 and R3 are the same rule, in which case R3 should be removed since it is truly redundant.

As an additional or alternative approach, the specific value for a specialization lift threshold may be calculated at the calculator 330 as a function of the confidence of the subsuming rule so that the value decreases with increasing confidence of the subsuming rule. With this approach, when the confidence of both the subsuming rule and subsumed rule are low, a larger value for specialization lift allows more low confidence rules to be filtered. As the confidence of the subsuming rule increases, fewer rules should be filtered. A simple linear relationship can be used, or a higher order relationship can be used to force the threshold to be very small for high confidence rules, and still large for low confidence rules.

With reference to the preliminary rule set 304 depicted in FIG. 3, an illustrative linear calculation of the specialization lift threshold (SL=(100%−(Subsuming Rule Confidence))× 0.175) may be applied to the rules R1-R6 to identify subsumed rules that may be removed from the rule set. With this equation, the required lift relative to a subsuming rule with 60% confidence would be 7%, and the required lift relative to a subsuming rule with 50% confidence would be 8.75%. For example, once it is determined that R3 subsumes R2, the relative confidences are compared using the calculated specialization lift threshold equation, SL=(100%− R3confidence)×0.175=(100%−60%)×0.175=40%× 0.175=7%. Since the subsumed rule R2 (with confidence 66%) does not provide the required lift, rule R2 may be removed from the final rule set 306. On the other hand, once it is determined that R4 subsumes R3, the specialization lift threshold is calculated for the subsuming rule R4 (SL= (100%−R4confidence)×0.175=(100%−50%)×0.175=50%× 0.175=8.75%. Since the subsumed rule R3 (with confidence 60%) provides the required lift over subsuming rule R4, rule R3 is retained in the final rule set 306.

As will be appreciated, other equations may be used to calculate the specialization lift threshold. For example, the threshold may be reduced for high confidence rules with the calculation equation, SL=(100%−(Subsuming Rule Confidence))×(100%−(Subsuming Rule Confidence))×0.2). Using this approach, the required lift relative to a subsuming rule with confidence 20% would be 12.8%; the required lift relative to a subsuming rule with 50% confidence would be 5%; and the required lift relative to a subsuming rule with 80% confidence would be 0.8%.

In an exemplary embodiment, the system and method for efficiently generating association rules may be implemented with a data processing system that processes transaction database information to provide a frequent set with attribute-based items identifying the purchased product, and to more efficiently generate association rules from the generated frequent set. For example, data processing may be performed on computer system 10 which may be found in many forms including, for example, mainframes, minicomputers, workstations, servers, personal computers, internet terminals, notebooks, wireless or mobile computing devices (including personal digital assistants), embedded systems and other information handling systems, which are designed to provide computing power to one or more users, either locally or remotely. A computer system 10 includes one or more microprocessor or central processing units (CPU) 12, mass storage memory 14 and local RAM memory 15. The processor 12, in one embodiment, is a 32-bit or 64-bit microprocessor manufactured by Motorola, such as the 680×0 processor or microprocessor manufactured by Intel, such as the 80×86, or Pentium processor, or IBM. However, any other suitable single or multiple microprocessors or microcomputers may be utilized. Computer programs and data are generally stored as instructions and data in mass storage 14 until loaded into main memory 15 for execution. Main memory 15 may be comprised of dynamic random access memory (DRAM). As will be appreciated by those skilled in the art, the CPU 12 may be connected directly (or through an interface or bus) to a variety of peripheral and system components, such as a hard disk drive, cache memory, traditional I/O devices (such as display monitors, mouse-type input devices, floppy disk drives, speaker systems, keyboards, hard drive, CD-ROM drive, modems, printers), network interfaces, terminal devices, televisions, sound devices, voice recognition devices, electronic pen devices, and mass storage devices such as tape drives, hard disks, compact disk ("CD") drives, digital versatile disk ("DVD") drives, and magneto-optical drives. The peripheral devices usually communicate with the processor over one or more buses and/or bridges. Thus, persons of ordinary skill in the art will recognize that the foregoing components and devices are used as examples for the sake of conceptual clarity and that various configuration modifications are common.

Figure 4:
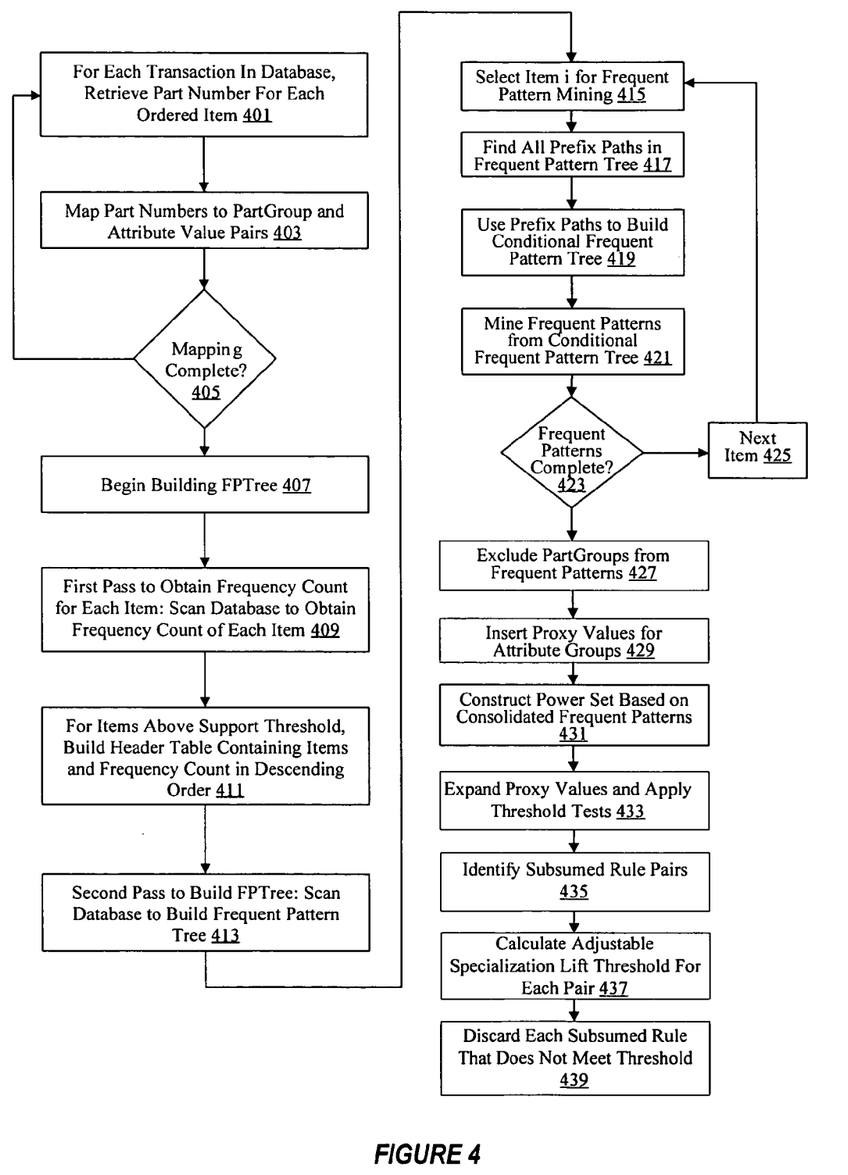
FIG. 4 shows a flowchart schematically illustrating the process of finding frequent patterns using a frequent pattern tree and efficiently generating attribute-based association rules from the frequent pattern tree.

Turning now to FIG. 4, an exemplary flow methodology is illustrated for finding frequent patterns using a frequent pattern tree and mining attribute-based association rules from the frequent pattern tree. As will be appreciated, the methodology illustrated in FIG. 4 shows the steps for generating attribute-based items, for using an FPTree to identify a frequent set using FPGrowth techniques, for generating association rules from the attribute-based items in the frequent set and for filtering our subsumed rules that do not provide sufficient lift. These steps may be performed for each entry in a transaction database to expedite the generation of association rules having improved pattern correlation. In addition, it will be appreciated that the methodology of the present invention may be thought of as performing the identified sequence of steps in the order depicted in FIG. 4, though the steps may also be performed in parallel, in a different order, or as independent operations that separately identify and store a frequent set and generate association rules therefrom.

The description of the method can begin at step 401, where an item corresponding to an ordered part number is retrieved from a first data set in a transaction database. Each retrieved part number is transformed or mapped into a Part Group item and/or attribute value pairs at step 403, thereby creating a second data set. For a given database, each retrieved part number is transformed until the mapping is complete (affirmative outcome to decision 405).

Once the second data set is complete, the process of constructing an FPTree begins at step 407 by making a first pass through the second (mapped) data set to obtain a frequency count for each item in the second data set. For items identified at step 409 that are above the minimum support threshold requirement, a header table is built at step 411 that lists the items and frequency count in descending order. Next, a second pass through the second data set is made at step 413 to build the FPTree by sorting the frequent items in a transaction based on header table order, merging the transactions with identical item sets and having transactions with the same prefix share the same path in the tree. At the conclusion of step 413, the FPTree data structure is completed and stored in memory, and may be used with the FPGrowth technique to generate the frequent patterns or frequent set.

In particular, the FPGrowth technique selects an item at step 415, finds all prefix patterns in the FPTree for that item at step 417 and uses the prefix paths to build a conditional FPTree at step 419. With the conditional FPTree, frequent patterns are mined for each selected item (step 423), and the process repeats until all items have been processed (affirmative outcome to decision 423). At this point (which corresponds to the output of frequent pattern generator 324 in FIG. 3), the process of generating rules from the frequent set may begin. However, by virtue of transforming the first data set to represent items in terms of their features (such as part groups and attribute-value pairs) to provide sufficient detail so that association rule mining can be used for complex products, the representation at this level results in a combinatorial explosion in the amount of data that the rule generation algorithms must examine. To manage that combinatorial explosion, selected attribute and part group items may be consolidated during the subset generation process. As illustrated at step 427, the Part Group items may be excluded from the frequent set, at least where the frequent set already contains attribute values corresponding to the Part Group. In addition or in the alternative, all item references for the same part group may be considered as a unit by inserting a proxy value in their place during the power set generation process (as indicated at step 429). Once the attribute values are consolidated, the power set is generated based on the consolidated proxy values (step 431). After the subsets are generated, the subsets are expanded by replacing the proxy values with the original attribute values, and then the threshold tests are applied to generate association rules that meet the threshold requirements (step 433).

The generated association rules may then be filtered to remove redundant rules by processing the generated rule set to identify any rule that subsumes another rule (step 435). For each identified subsumed rule pair, an adjustable specialization lift threshold is calculated (step 437). For example, the threshold may be calculated as a function of the confidence of the subsuming rule in the subsumed rule pair, and/or may be calculated as a function of the confidence of the subsumed rule in the subsumed rule pair. By applying the calculated adjustable specialization lift threshold to each subsumed rule pair, subsumed rules not providing the confidence lift specified by the threshold may be discarded from the generated set of association rules (step 439).

The above-discussed embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to improve the generation of attribute-based rules. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

The computer-based data processing system described above is for purposes of example only, and may be implemented in any type of computer system or programming or processing environment, or in a computer program, alone or in conjunction with hardware. Various embodiments of the present may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A computer-based method of generating association rules to extract useful information from an input data set of items for use in market analysis applications, comprising:
    identifying one or more generic items in the input data set;
    transforming the input data set into a second data set by
        mapping each identified generic item into a set of items based on attributes corresponding to the generic item;
    generating a preliminary set of association rules based on the second data set, where each association rule in the preliminary set of association rules comprises data that represents a plurality of physical or tangible objects as well as an association relationship therebetween;
    transforming the preliminary set of association rules into a final set of association rules with a processor by:
        identifying a first rule having a first confidence measure from the preliminary set of association rules;
        calculating a scaled lift threshold value based on the first confidence measure, where the scaled lift threshold value is scaled as a function of the first confidence measure so that the scaled lift threshold value is larger for a relatively small first confidence measure and is smaller for a relatively large first confidence measure; and
        removing a second rule having a second confidence measure from the preliminary set of association rules to generate the final set of association rules if the second rule is subsumed by the first rule and the second confidence measure does not exceed the first confidence measure by more than the scaled lift threshold value; and
    storing the final set of association rules in a memory storage database.

2. The method of claim 1, where the scaled lift threshold value is calculated as a linear function of the first confidence measure.

3. The method of claim 1, where the scaled lift threshold value is calculated as a non-linear function of the first confidence measure.

4. The method of claim 1, where the scaled lift threshold value is calculated by determining a complement of the first confidence measure and multiplying the complement by a scaling factor between 0 and 1.

5. The method of claim 1, where the scaled lift threshold value is calculated by determining a complement of the first confidence measure, squaring the complement to obtain a squared value and multiplying the squared value by a scaling factor.

6. The method of claim 1, where the scaled lift threshold value decreases as the first confidence measure increases.

7. The method of claim 1, further comprising retaining the second rule in the final set of association rules if the second rule is subsumed by the first rule and the second confidence measure exceeds the first confidence measure by at least the scaled lift threshold value.

8. The method of claim 1, further comprising removing a third rule from the preliminary set of association rules to generate the final set of association rules if the third rule provides a trivial association.

9. The method of claim 8, where the third rule provides a trivial association when an antecedent and a consequent in the third rule belong to a common part group.

10. The method of claim 1, further comprising removing a third rule from the preliminary set of association rules to generate the final set of association rules if the third rule has only a part group as a consequent.

11. The method of claim 1, further comprising modifying a third rule to remove a first antecedent from the third rule that is redundant to a second antecedent in the third rule.

12. The method of claim 1, further comprising modifying a third rule to remove a part group antecedent from the third rule that is redundant to another antecedent in the third rule.

13. An article of manufacture having at least one recordable non-transitory medium having stored thereon executable instructions and data which, when executed by at least one processing device, generate association rules to extract useful information from a database for use in market analysis applications by causing the at least one processing device to:
    generate a preliminary set of association rules;
    identify a first rule having a first confidence measure from the preliminary set of association rules;
    calculate a scaled lift threshold value which is scaled based on the first confidence measure; and
    remove a second rule having a second confidence measure from the preliminary set of association rules to generate a final set of association rules if the second rule Is subsumed by the first rule and the second confidence measure does not exceed the first confidence measure by more than the scaled lift threshold value.

14. The article of manufacture of claim 13, wherein the scaled lift threshold value is calculated as a linear function of the first confidence measure.

15. The article of manufacture of claim 13, wherein the scaled lift threshold value is calculated as a non-linear function of the first confidence measure.

16. The article of manufacture of claim 13, wherein the scaled lift threshold value is calculated by determining a complement of the first confidence measure, squaring the complement to obtain a squared value and multiplying the squared value by a scaling factor between 0 and 1.

17. The article of manufacture of claim 13, wherein the scaled lift threshold value decreases as the first confidence measure increases.

18. A computer-implemented system for mining attribute-based association rules to extract useful information from a database for use in market analysis applications, comprising:
   a database for storing a plurality of transactions;
   a processor coupled to the database and to a memory having code stored therein comprising:
   a processing engine to transform the plurality of transactions into an attribute-based data set and to identify a frequent set from the attribute-based data set; and
   a rule generator for generating association rules from the frequent set, said rule generator comprising means for discarding a first association rule having a first confidence measure that is subsumed by a second association rule having a second confidence measure if the first confidence measure does not exceed the second confidence measure by at least a scaled lift threshold value, where the scaled lift threshold value is scaled as a function of the first confidence measure.

19. The system of claim 18, wherein the scaled lift threshold value decreases as the first confidence measure increases.

20. The system of claim 18, wherein the rule generator retains the first association rule if the first association rule is subsumed by the second association rule and the first confidence measure exceeds the second confidence measure by at least the scaled lift threshold value.

21. The system of claim 18, wherein the rule generator comprises means for discarding a third association rule if the third association rule provides a trivial association.

22. The system of claim 18, where the rule generator comprises means for removing a third association rule if the third association rule has only a part group as a consequent.

23. The system of claim 18, where the rule generator comprises means for modifying a third association rule to remove a first antecedent from the third association rule that is redundant to a second antecedent in the third association rule.

24. The system of claim 18, where the rule generator comprises means for modifying a third association rule to remove a part group antecedent from the third association rule that is redundant to another antecedent in the third association rule.

* * * * *